(12) United States Patent
Liversage

(10) Patent No.: US 9,606,008 B2
(45) Date of Patent: Mar. 28, 2017

(54) TEMPERATURE SENSOR

(75) Inventor: John Hewitt Liversage, Springs (ZA)

(73) Assignee: Element Six Abrasives S.A., Luxembourg (LU)

( * ) Notice: Subject to any disclaimer, the term of this patent is extended or adjusted under 35 U.S.C. 154(b) by 0 days.

(21) Appl. No.: 14/238,606

(22) PCT Filed: Aug. 10, 2012

(86) PCT No.: PCT/EP2012/065698
§ 371 (c)(1),
(2), (4) Date: Feb. 12, 2014

(87) PCT Pub. No.: WO2013/026718
PCT Pub. Date: Feb. 28, 2013

(65) Prior Publication Data
US 2014/0198827 A1   Jul. 17, 2014

Related U.S. Application Data

(60) Provisional application No. 61/526,215, filed on Aug. 22, 2011.

(30) Foreign Application Priority Data

Aug. 22, 2011   (GB) ................................ 1114379.9

(51) Int. Cl.
*G01K 7/00*   (2006.01)
*G01K 13/00*   (2006.01)
(Continued)

(52) U.S. Cl.
CPC ............ *G01K 13/00* (2013.01); *C04B 35/645* (2013.01); *E21B 10/567* (2013.01);
(Continued)

(58) Field of Classification Search
USPC ......................................... 374/147, 185, 141
See application file for complete search history.

(56) References Cited

U.S. PATENT DOCUMENTS 5,066,938 A * 11/1991 Kobashi et al. ......... 338/22 SD
5,183,530 A *  2/1993 Yamazaki ....................... 438/54
(Continued)

FOREIGN PATENT DOCUMENTS

EP   0452141 A2   10/1991
EP   0512694 A2   11/1992
(Continued)

OTHER PUBLICATIONS

International Search Report for PCT/EP2012/065698 dated Jul. 19, 2013.
(Continued)

*Primary Examiner* — Mirellys Jagan
(74) *Attorney, Agent, or Firm* — Bryan Cave LLP

(57) ABSTRACT

A temperature sensor comprises a body of polycrystalline superhard material comprising a plurality of intergrown grains and a binder phase, the polycrystalline material defining a plurality of interstices between the grains, the binder phase being distributed in a plurality of the interstices; and two or more electrodes attached to or embedded in the body of polycrystalline material arranged to measure bulk resistance of the polycrystalline superhard material between the electrodes, the measured resistance being indicative of the temperature of the body of polycrystalline material.

17 Claims, 3 Drawing Sheets

(51) Int. Cl.
  *G01K 7/16* (2006.01)
  *G01K 13/08* (2006.01)
  *E21B 47/06* (2012.01)
  *E21B 10/573* (2006.01)
  *E21B 47/01* (2012.01)
  *C04B 35/645* (2006.01)
  *E21B 10/567* (2006.01)

(52) U.S. Cl.
  CPC .......... *E21B 10/5735* (2013.01); *E21B 47/01* (2013.01); *E21B 47/065* (2013.01); *G01K 7/16* (2013.01); *G01K 13/08* (2013.01); *Y10T 29/49117* (2015.01)

(56) References Cited

U.S. PATENT DOCUMENTS

| | | | |
|---|---|---|---|
| 5,252,498 A | | 10/1993 | Yamazaki |
| 5,317,302 A * | | 5/1994 | Yamazaki ............... 338/22 SD |
| 5,776,323 A | | 7/1998 | Kobashi |
| 7,604,072 B2 | | 10/2009 | Pastusek et al. |
| 8,459,380 B2 * | | 6/2013 | Mirchandani ......... B22F 3/1035 175/374 |
| 2002/0194955 A1 * | 12/2002 | Fang et al. ....................... 75/240 |
| 2009/0038858 A1 * | 2/2009 | Griffo .................... E21B 10/25 175/371 |
| 2010/0123098 A1 | 5/2010 | Hemley et al. |
| 2011/0266054 A1 * | 11/2011 | Kumar et al. ................... 175/39 |
| 2011/0266055 A1 * | 11/2011 | DiGiovanni et al. ........... 175/50 |
| 2011/0278074 A1 * | 11/2011 | Naidoo et al. ................ 175/428 |
| 2012/0325564 A1 * | 12/2012 | Vaughn et al. ................ 175/428 |
| 2013/0032412 A1 * | 2/2013 | Haugvaldstad ......... E21B 10/00 175/425 |
| 2013/0068525 A1 * | 3/2013 | DiGiovanni .................... 175/40 |

FOREIGN PATENT DOCUMENTS

| | | |
|---|---|---|
| GB | 2362655 A | 11/2011 |
| WO | 2004/025234 A1 | 3/2004 |

OTHER PUBLICATIONS

Search Report for GB1114379.9 dated Dec. 22, 2011.
Search Report for GB1214315.2 dated Dec. 10, 2012.

* cited by examiner

FIGURE 3
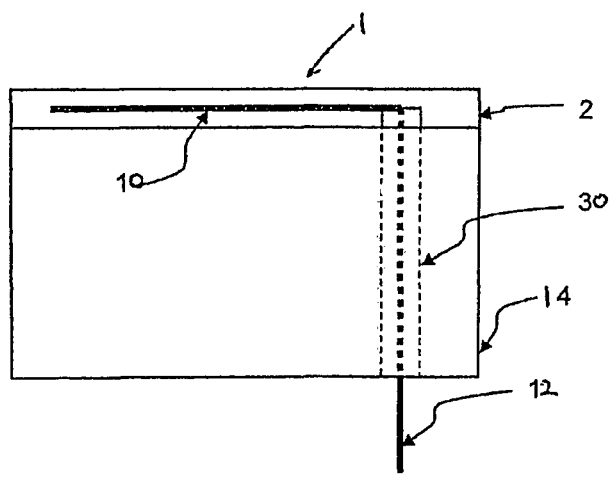
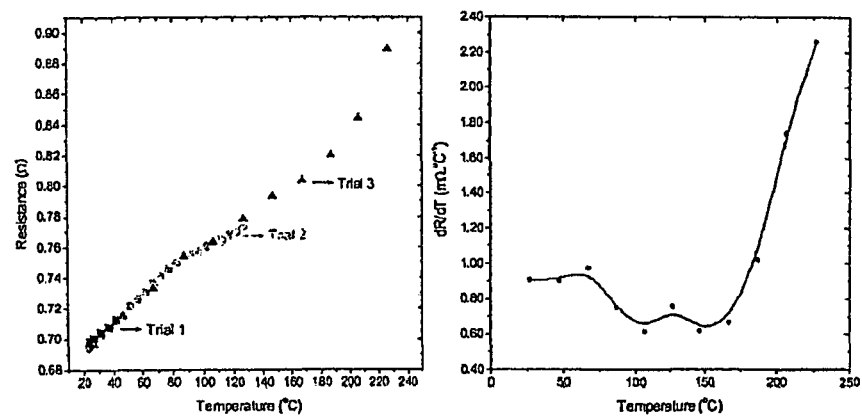
FIGURE 4a                FIGURE 4b

TEMPERATURE SENSOR

FIELD

This disclosure generally relates to a temperature sensor for use in devices and methods for acquiring information relating to tools such as earth-boring drill bits, cutters attached thereto, and other tools that may be used in harsh environments such as during subterranean drilling.

BACKGROUND

Polycrystalline diamond (PCD) material comprises a mass of inter-grown diamond grains and interstices between the diamond grains. PCD material may be made by subjecting an aggregated mass of diamond grains to a high pressure and temperature in the presence of a sintering aid such as cobalt, which may promote the inter-growth of diamond grains. The sintering aid may also be referred to as a catalyst material for diamond. Interstices within the sintered PCD material may be wholly or partially filled with residual catalyst material. PCD may be formed on a cobalt-cemented tungsten carbide substrate, which may provide a source of cobalt catalyst material for sintering the PCD.

PCD material may be used in a wide variety of tools for cutting, machining, drilling or degrading hard or abrasive materials such as rock, metal, ceramics, composites and wood-containing materials. For example, tool inserts comprising PCD material attached to a substrate are widely used in drill bits for boring into the earth in the oil and gas drilling industry. In many of these applications, the temperature of the PCD material may become elevated as it engages, at high energy, rock or other workpieces or bodies.

PCD is extremely hard and abrasion resistant, which is the reason it is the preferred tool material in some of the most extreme machining and drilling conditions, and where high productivity is required. Unfortunately, PCD suffers from a number of disadvantages, several of which are associated with the metallic binder material typically used. For example, metal binder may corrode in certain applications such as the high speed machining of wood. In addition, metals or metal alloys are relatively soft and susceptible to abrasion, reducing the average wear resistance of the PCD material. However, the most problematic aspect of PCD is arguably its relatively poor thermal stability above about 400° C.

In use, the temperature of a PCD working element at a working surface may approach 1,000° C. in certain applications such as rotary rock drilling. Heat tends to degrade PCD in two principal ways, namely by inducing thermal stress arising from differences in thermal expansion of the diamond, the binder and the substrate, and by inducing the diamond to convert to graphite, which is the thermodynamically stable phase of carbon at ambient conditions. The former mechanism sets in above about 400° C. and becomes progressively more significant as the temperature is increased. The temperature at which the latter mechanism becomes significant depends on the nature, quantity and spatial distribution of the binder material in relation to the diamond. The most commonly used binder metals are selected because they catalyse the sintering of diamond at ultra-high pressures. Unfortunately, these same metals also catalyse the reverse process of diamond conversion to graphite (or "graphitisation") at lower pressures. In the most typical case where the binder is Co, significant graphitisation is believed occur above about 750° C. in air.

The working life of tool inserts may therefore be limited by graphitisation of the superhard material at high working temperatures which could induce spalling and chipping.

Polycrystalline diamond compacts (PDC) which may form cutting tools for use in drill bits in industrial applications such as drilling in the oil and gas industry, are therefore often exposed to extremes of pressure and temperature in hostile, abrasive and erosive environments.

Operating temperatures experienced by a cutting element whilst drilling are thought to have a major effect on the tool life and general durability of these PDC cutters. However, there is still much uncertainty and debate around what the range of actual cutting temperatures might be as conventional sensors for temperature and pressure are unable to survive during the drilling process.

Information relating to the environment being drilled and the performance of the cutter would be useful for drill bit operators as it may enable the characterization and evaluation of the durability, performance, and potential failure of the drill bit.

There is therefore a need to provide a method and apparatus for obtaining information relating to performance and/or behaviour of a drill bit and related components whilst the drill bit is in use.

SUMMARY

Viewed from a first aspect there is provided a temperature sensor comprising:
 a body of polycrystalline superhard material comprising a plurality of intergrown grains and a binder phase, the polycrystalline material defining a plurality of interstices between the grains, the binder phase being distributed in a plurality of the interstices; and
 two or more electrodes attached to or embedded in the body of polycrystalline material arranged to measure bulk resistance of the polycrystalline superhard material between the electrodes, the measured resistance being indicative of the temperature of the body of polycrystalline material.

A processing module may be attached to the two or more electrodes and arranged to convert the measured bulk resistance of the polycrystalline superhard material to the temperature of the body of polycrystalline material.

The polycrystalline superhard material may comprise, for example, polycrystalline diamond material (PCD) or polycrystalline cubic boron nitride (PCBN).

Viewed from a further aspect there is provided a cutting element comprising the above-mentioned temperature sensor.

Viewed from another aspect there is provided a PCD element for a rotary shear bit for boring into the earth, for a percussion drill bit or for a pick for mining or asphalt degradation, comprising the above-mentioned cutter element bonded to a cemented carbide support body.

Viewed from yet another aspect there is provided a drill bit or a component of a drill bit for boring into the earth, comprising the above-mentioned PCD element.

Viewed from a further aspect there is provided a method for forming a temperature sensor, the method comprising:
 attaching or at least partially embedding at least two or more electrodes in a body of polycrystalline superhard material, the polycrystalline superhard material comprising a plurality of intergrown grains and a binder phase, the polycrystalline material defining a plurality of interstices between the grains, the binder phase being distributed in a plurality of the interstices; the two or more electrodes attached to or embedded in the body of polycrystalline material being arranged to measure bulk resistance of the polycrystalline superhard material between the electrodes, the measured resistance being indicative of the temperature of the body of polycrystalline material.

Viewed from another aspect there is provided a method for measuring temperature of a body of polycrystalline superhard material, the method comprising:

measuring bulk resistance of the polycrystalline superhard material between a plurality of electrodes embedded in or attached to the body of polycrystalline superhard material, the measured resistance being indicative of the temperature of the body of polycrystalline material.

BRIEF DESCRIPTION OF THE DRAWINGS

Non-limiting embodiments will now be described by way of example and with reference to the accompanying drawings in which:

FIG. 3 is a side elevation of the cutter element of FIG. 2;

FIG. 4a is a plot of measurements of the variation of bulk resistance of a PCD body with temperature according to an embodiment;

FIG. 4b is a plot of the relative change in bulk resistance with temperature of a PCD body according to an embodiment for a four-wire measurement.

The drawings are not intended to be actual views of any particular material, apparatus, system, or method, but are merely representations used to illustrate the present disclosure. Common elements in the figures have been given the same numerical designation.

DETAILED DESCRIPTION OF EMBODIMENTS

As used herein, a "drill bit" means and includes any type of bit or tool used for drilling during the formation or enlargement of a wellbore in subterranean formations and includes, for example, fixed cutter bits, rotary drill bits, percussion bits, core bits, eccentric bits, bi-center bits, reamers, mills, drag bits, roller cone bits, hybrid bits and other drilling bits and tools known in the art.

As used herein, the term "polycrystalline material" means and includes any material comprising a plurality of grains or crystals of the material that are bonded together by intergranular bonds. As used herein, polycrystalline diamond (PCD) is considered as comprising a mass of diamond grains, a substantial portion of which are directly interbonded with each other and in which the content of diamond is at least about 80 volume percent of the material. As used herein, "interstices" or "interstitial regions" are regions between the diamond grains of PCD material. In some embodiments, interstices between the diamond grains may be at least partly filled with a binder material comprising a catalyst for diamond, namely a material other than diamond.

Figure 1:
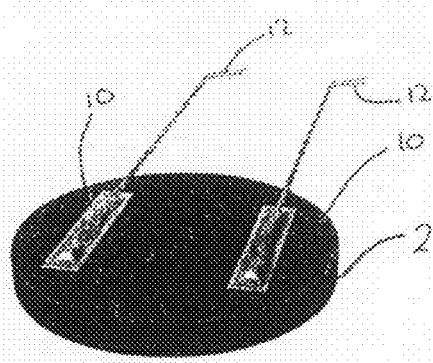
FIG. 1 is perspective view from above of a body of PCD material according to one embodiment.
Figure 2:
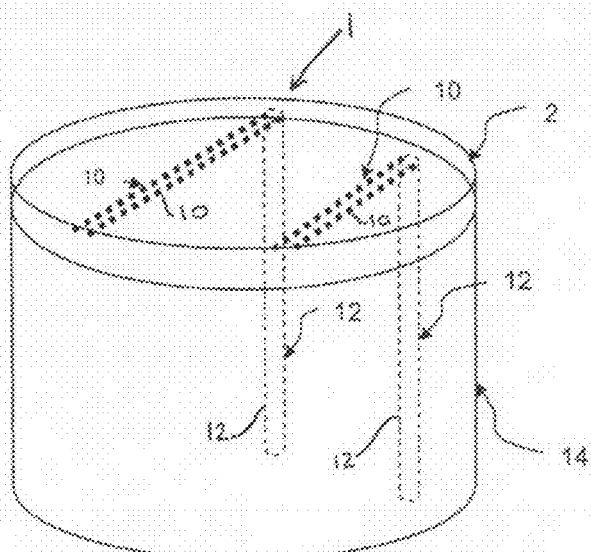
FIG. 2 is a perspective view from above of a body of PCD material attached to a substrate to form a cutter element according to a further embodiment.

FIGS. 1, 2 and 3 illustrate a cutter 1 according to various embodiments of the present disclosure. One or more such cutters 1 may be included in an earth-boring drill bit, such as, for example an earth-boring drill bit similar to the one illustrated in and described with reference to FIG. 5 below.

FIG. 1 shows a body of PCD material 2 suitable for forming part of a cutter 1. Two electrodes 10 are attached to an outer face of the body of PCD material 2 and wires 12 are attached to the electrodes 10 for transporting the data from the electrodes 10 to a data collection module (not shown). The body of PCD material 2 itself forms a temperature sensing element and operates in the manner described in more detail below.

In the embodiments shown in FIGS. 2 and 3, the body of PCD material 2 is bonded to a substrate 14, such as a tungsten carbide substrate, and a plurality of electrodes 10 to take a four wire measurement are embedded in the body of PCD material 2, together with lead-out wires 12 for transporting the data therefrom, one wire being connected to each electrode. One end of each of the wires 12 is attached to a respective electrode 10 and the other end of the wires may be attached to a data collection module (not shown), with the wires 12 extending through the substrate 14 and through an aperture in the base of the substrate 14 to the data collection module.

FIGS. 2 and 3 show a cutter 1 finished to specification after HPHT synthesis. Finishing may include processing such as grinding, lapping, polishing and the like. During the finishing process, the cutting surface may be formed as well as other features, such as a chamfer 50 around the peripheral free edge of the body of PCD material.

In some embodiments, the data collection module may be attached to the drill bit to which the cutter 1 is attached in use. The data collection module may include components such as, for example, an analogue-to-digital converter, analysis hardware/software, displays, and other components for collecting and/or interpreting data generated by the sensors in the cutter(s). For example, some earth-boring drill bits including such a data collection/processing module may be termed a "Data Bit" module-equipped bit, which may include electronics for obtaining and processing data related to the bit and the bit frame, such, as is described in U.S. Pat. No. 7,604,072.

In some embodiments such as those shown in FIGS. 3 and 4, the electrodes 10 may be embedded in the body of PCD material 2 before the cutter 1 is processed (for example before HPHT synthesis has occurred) and finished. In other embodiments, the electrodes 10 may be embedded during or after processing and finishing.

As described above, polycrystalline diamond (PCD) material comprises a mass of inter-grown diamond grains and interstices between the diamond grains and may be made by subjecting an aggregated mass of diamond grains to a high pressure and temperature in the presence of a sintering aid such as cobalt, which may promote the inter-growth of diamond grains. The sintering aid may also be referred to as a catalyst material for diamond. Interstices within the sintered PCD material may be wholly or partially filled with residual catalyst material. PCD may be formed on a cobalt-cemented tungsten carbide substrate, which may provide a source of cobalt catalyst material for sintering the PCD.

The residual catalyst material (which may be termed the intergranular binder) within the PCD body has been found to exhibit metallic electrical transport characteristics, indicated by an increase in resistance with temperature. Measurements of the bulk resistance-temperature behaviour for a PCD body are illustrated in FIG. 4a and show a relatively linear increase in resistance up to around 230 degrees C. This behaviour was found to be very reproducible and it did not suffer from hysteresis effects. The relative change in resistance (at around 1 mOhm per degree C.) is shown in FIG. 4b for a four-wire measurement.

In practice, the linear approximation above may only work over a limited temperature range. For accurate temperature measurements, the resistance/temperature curve of the device may be described in more detail. The Steinhart-Hart equation is a suitable third-order approximation:

$$\frac{1}{T} = a + b\ln(R) + c\ln^3(R)$$

where a, b and c are called the Steinhart-Hart parameters, and must be specified for each device. T is the temperature in kelvin and R is the resistance in ohms. To give resistance as a function of temperature, the above can be rearranged into:

$$R = e^{(x-\frac{y}{2})^{\frac{1}{3}} - (x+\frac{y}{2})^{\frac{1}{3}}}$$

where $$y = \frac{a - \frac{1}{T}}{c} \text{ and } x = \sqrt{\left(\frac{b}{3c}\right)^3 + \frac{y^2}{4}}$$

The error in the Steinhart-Hart equation is generally less than 0.02° C. in the measurement of temperature. As an example, typical values for a thermistor with a resistance of 3000Ω at room temperature (25° C.=298.15 K) are:

$a=1.40\times10^{-3}$ $b=2.37\times10^{-4}$ $c=9.90\times10^{-8}$

Assuming, as a first-order approximation, that the relationship between resistance and temperature is linear, then:

$\Delta R = k\Delta T$ where
$\Delta R$=change in resistance
$\Delta T$=change in temperature
k=first-order temperature coefficient of resistance The body of PCD material 2 with a pair of electrodes 10 attached to an exposed surface of the PCD material, as shown in FIG. 1, may be formed by creating the PCD body in a conventional manner and then bonding the electrodes to the surface, for example by adhesive or deposition.

The cutter 1 may be formed by disposing a hard, super-abrasive material, such as interbonded particles of polycrystalline diamond formed into a body of PCD material 2 under high pressure, high temperature conditions, on the supporting substrate 14. The body of PCD material 2 may be formed on the substrate 14 during the high pressure, high temperature process, or may be bonded to the substrate 14 thereafter.

An example of a conventional method of forming the PCD material 2 is to provide a support body, for example the substrate 14, comprising cemented carbide in which the cement or binder material comprises a catalyst material for diamond, such as cobalt. The support body may have a non-planar end or a substantially planar proximate end on which the PCD structure is to be formed. A non-planar shape of the end may be configured to reduce undesirable residual stress between the PCD structure and the support body. A cup may be provided for use in assembling the diamond grains on the support body. In one version of the method, a layer of substantially loose diamond grains may be packed into the cup. The support body may then be inserted into the cup with the proximate end going in first and pushed against the substantially loose diamond grains, causing them to move slightly and position themselves according to the shape of the non-planar end of the support body to form a pre-sinter assembly.

The pre-sinter assembly may be placed into a capsule for an ultra-high pressure press and subjected to an ultra-high pressure of at least about 5.5 GPa and a high temperature of at least about 1,300 degrees centigrade to sinter the diamond grains and form a PCD element comprising a PCD structure integrally joined to the support body. In one version of the method, when the pre-sinter assembly is treated at the ultra-high pressure and high temperature, the binder material within the support body melts and infiltrates the strata of diamond grains. The presence of the molten catalyst material from the support body is likely to promote the sintering of the diamond grains by intergrowth with each other to form an integral, stratified PCD structure.

The electrodes 10 may then be bonded to the surface of the body of PCD material 2, for example by adhesive or deposition.

The body of PCD material 2 with electrodes 10 embedded therein, as shown in FIGS. 2 and 3 may be formed, for example, as follows. A number of metal wire electrodes 10, such as W, Mo, Nb, Pt, Au, Pd, Re, Ir or Cu, may be placed within the diamond powder via a conduit 30 machined along the periphery of the substrate 14 remote from the intended cutting edge. The electrodes 10 may be isolated from the substrate 14, if required, by lining the conduits 30 with a tubular $Al_2O_3$ preform. The assembly may then be subjected to HpHT sintering of the PCD in the conventional manner, leaving two or four electrodes 10 permanently nested within the PCD body and their leads 12 running from the base of the cutter.

A calibration table may be generated prior to use of the PCD sensor by determining resistance measurements at various temperatures. The PCD sensor is then ready for use in the desired working environment.

In use, the body of PCD material 2 may form part of a cutter 1 or other instrument, and may be located in a working environment, for example, mounted in a drill bit down a bore hole. Changes in the bulk resistance of the PCD body 2 are transmitted to the processing module through the electrodes 10 and wires 12 attached thereto. The measured changes in bulk resistance are processed and converted into temperature measurements using pre-determined conversion factors, for example as shown in FIGS. 4a and 4b or described above. In this manner, the operating temperatures in the working environment may be monitored and used by the drill bit operator to control operations and assess the effects of high temperatures on the PCD cutter 1 at those temperatures.

The above-mentioned characteristics of the intergranular binder in the PCD provides a workable means for estimating the operating temperature of a cutter 1 or PCD table in application. No invasive changes are required within the cutter 1 near the cutting edge on the PCD body 1 which may be advantageous in use.

The diamond material may be formed of natural or synthetic diamond grains. The electrical signals measured are representative of the bulk resistance between the electrodes which varies with the temperature of the environment in which the PCD body is located.

Figure 5:
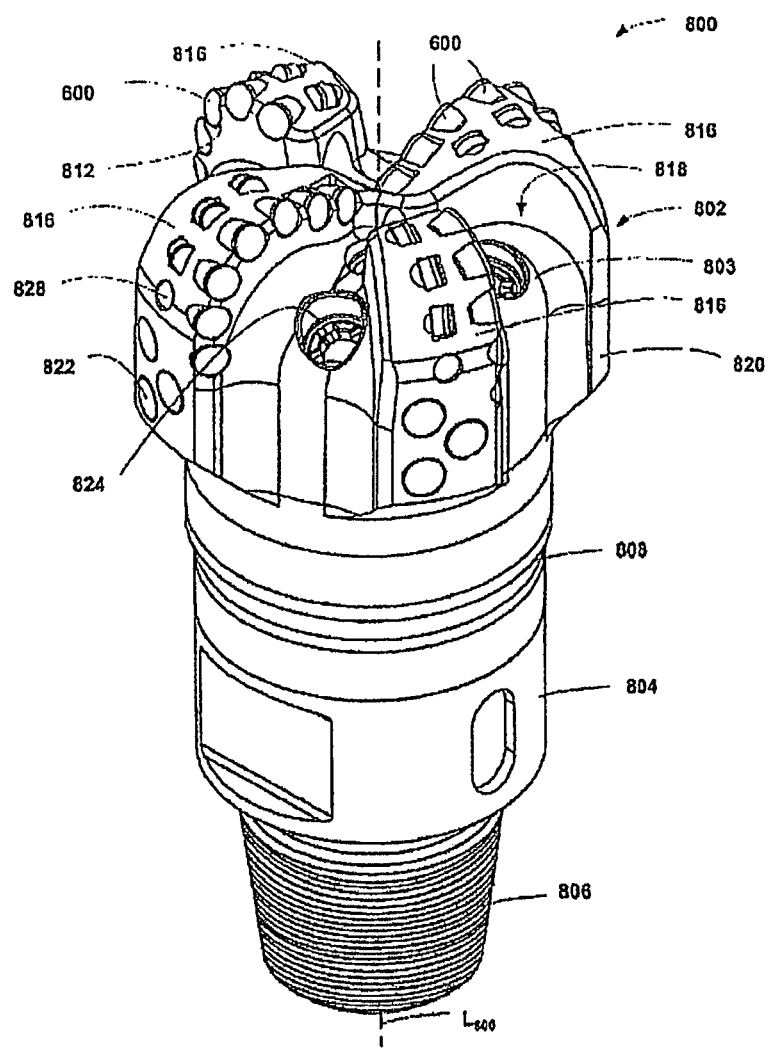
FIG. 5 is a perspective view of an earth-boring drill bit.

FIG. 5 is a perspective view of an earth-boring rotary drill bit 800 comprising a bit body 802 and a plurality of cutters 1 as previously described herein with reference to FIGS. 1 to 3, attached to a face 803 of the bit body 802. Typically, the cutters 1 of a fixed-cutter type drill bit are either disc shaped or substantially cylindrical in shape. The cutters 1 include a cutting surface located on a substantially circular end surface of the cutters 1.

The bit body 802 is secured to a shank, 804, having a threaded connection portion, 806, (e.g., a threaded connection portion, 806, conforming to industry standards such as those promulgated by the American Petroleum Institute (API)) for attaching the drill bit, 800, to a drill string (not shown). The bit body, 802, may comprise a particle-matrix composite material or a metal alloy such as steel. The bit body 802, may be secured to the shank, 804, by one or more of a threaded connection, a weld, and a braze alloy at the interface between them. In some embodiments, the bit body, 802, may be secured to the shank, 804, indirectly by way of a metal blank or extension between them, as known in the art.

The bit body, 802, may include internal fluid passageways (not shown) that extend between the face, 803, of the bit body, 802, and a longitudinal bore (not shown), which extends through the shank, 804, the extension, 808, and partially through the bit body, 802. Nozzle inserts, 824, also may be provided at the face, 803, of the bit body, 802, within the internal fluid passageways. The bit body, 802, may further include a plurality of blades, 816, that are separated by junk slots, 818. In some embodiments, the bit body, 802, may include gage wear plugs, 822, and wear knots, 828. The plurality of PDC cutting elements 1 of one or more of embodiments, as previously described herein, which are generally indicated by reference numeral 1, may be mounted on the face 803 of the bit body, 802, in cutting element pockets, 812, that are located along each of the blades, 816.

The cutting elements 1 are positioned to cut a subterranean formation being drilled while the drill bit, 800, is rotated under weight on bit (WOB) in a bore hole about centreline, L800.

A bonding material such as an adhesive, or braze alloy may be used to secure the cutters 1 to the bit body 802.

In use, the earth-boring drill bit 800 may be secured to the end of the drill string (not shown), which may include tubular pipe and equipment segments coupled end to end between the earth-boring drill bit 800 and other drilling equipment at the surface of the formation to be drilled.

During drilling operations, the drill bit 800 is positioned at the bottom of a well bore hole such that the cutters 1 are adjacent the earth formation to be drilled. Equipment such as a rotary table or top drive may be used for rotating the drill string and the drill bit 800 within the bore hole. Alternatively, the shank 804 of the drill bit 800 may be coupled directly to the drive shaft of a down-hole motor, which then may be used to rotate the drill bit 800. As the drill bit 800 is rotated, drilling fluid is pumped to the face 803 of the bit body 802 through the longitudinal bore (not shown) and the internal fluid passageways (not shown). Rotation of the drill bit 800 causes the cutters 1 to scrape across and shear away the surface of the underlying formation. The formation cuttings mix with, and are suspended within, the drilling fluid and pass through the junk slots 818 and the annular space between the well bore hole and the drill string to the surface of the earth formation.

When the cutters 1 scrape across and shear away the surface of the underlying formation, a significant amount of heat and mechanical stress may be generated. Based on a thermoresistive response of the body of PCD material, information relating to the performance of the cutters 1, such as thermal data may be obtained.

In operation, the electrical signals representative of the temperature from the body of PCD material acting as a temperature diamond sensor are passed through conductive pathways, terminations, and conductive elements, and the signals are conveyed to the data collection module (not shown). Such data transmission may include wired or wireless communication.

One or more embodiments may be used to measure the temperature of a cutter 1 attached to a drill bit in operation in an economical manner. Such measurements may provide improved bit performance monitoring and control as well as providing an improved understanding of cutter behaviour in use.

Although the foregoing description contains many specifics, these are not to be construed as limiting the scope of the present disclosure, but merely as providing examples of embodiments. Similarly, other embodiments of the disclosure may be devised which do not depart from the scope of the present disclosure. Various modifications may be made to the present disclosure. For example, whilst various embodiments have been described in which the body of PCD material comprising the temperature sensor is designed for use as a cutter in the oil/gas drilling industry, temperature information is often required in other environments which could lead to a rapid chemical or erosive wear of a sensing device and therefore the body of PCD material could be used as a temperature sensing device for use in harsh chemical and erosive environments rather than forming part of a cutter. Furthermore, whereas some embodiments are directed to the use of a PDC cutter as the temperature sensor, where the sensing device forms an active part of the application (that is, cutting rock with the device itself), other embodiments pertain more to a PCD table, with appropriately fitted electrodes, used as a passive device fitted somewhere inside a generally harsh environment, where the device is used exclusively for temperature measurement.

Also, many potential electrode configurations are possible other than those illustrated and described herein. In addition, the body of PCD material may be partially leached using conventional techniques to remove the binder phase from a plurality of interstices. In such cases, the electrodes may be attached to or embedded in the body of polycrystalline material in a region in which the plurality of interstices contain binder phase.

The invention claimed is:

1. A temperature sensor comprising:
a body of polycrystalline superhard material comprising a plurality of intergrown grains and a binder phase, the polycrystalline material defining a plurality of interstices between the grains, the binder phase being distributed in a plurality of the interstices; and
two or more electrodes attached to or embedded in the body of polycrystalline material arranged to measure bulk resistance of the polycrystalline superhard material between the electrodes, the measured resistance being indicative of the temperature of the body of polycrystalline material.

2. The temperature sensor of claim 1, further comprising a processing module attached to the two or more electrodes and arranged to convert the measured bulk resistance of the polycrystalline superhard material to the temperature of the body of polycrystalline material.

3. The temperature sensor of claim 1, wherein the polycrystalline superhard material comprises polycrystalline diamond material (PCD) or polycrystalline cubic boron nitride (PCBN).

4. The temperature sensor of claim 1, further comprising a conductive pathway in communication with the electrodes.

5. The temperature sensor of claim 1, wherein a plurality of the interstices between the grains of polycrystalline superhard material are substantially free of binder phase and a further plurality of interstices between the grains contain binder phase, the electrodes being attached to or embedded in the body of polycrystalline superhard material in a region in which the plurality of interstices contain binder phase.

6. The temperature sensor of claim 1, wherein the electrodes comprise metal wire electrodes.

7. The temperature sensor of claim 6, wherein the electrodes are formed from any one or more of W, Mo, Nb, Pt, Au, Pd, Re, Ir or Cu.

8. A cutting element comprising the temperature sensor of claim 1.

9. The cutting element of claim 8, further comprising a substrate bonded to the body of polycrystalline superhard material.

10. A PCD element for a rotary shear bit for boring into the earth, for a percussion drill bit or for a pick for mining or asphalt degradation, comprising a cutter element as claimed in claim 8 bonded to a cemented carbide support body.

11. A drill bit or a component of a drill bit for boring into the earth, comprising a PCD element as claimed in claim 10.

12. A method for forming a temperature sensor, the method comprising:

attaching or at least partially embedding at least two or more electrodes in a body of polycrystalline superhard material, the polycrystalline superhard material comprising a plurality of intergrown grains of superhard material and a binder phase, the polycrystalline material defining a plurality of interstices between the grains, the binder phase being distributed in a plurality of the interstices;

the two or more electrodes attached to or embedded in the body of polycrystalline material being arranged to measure bulk resistance of the polycrystalline superhard material between the electrodes, the measured resistance being indicative of the temperature of the body of polycrystalline material.

13. The method of claim 12, further comprising removing the binder phase from a plurality of interstices between the grains of polycrystalline superhard material and attaching or embedding the electrodes in a region of the body of polycrystalline superhard material in which the interstices contain binder phase.

14. The method of claim 12 further comprising forming the temperature sensor of polycrystalline diamond material.

15. The method of claim 14, comprising forming the body of polycrystalline diamond material by providing a mass of diamond grains to form a pre-sinter assembly; and treating the pre-sinter assembly in the presence of a catalyst material for diamond at an ultra-high pressure and high temperature at which diamond is more thermodynamically stable than graphite to sinter together the diamond grains and form an integral PCD structure, the step of attaching or embedding the electrodes comprising attaching at least two or more electrodes to the body of polycrystalline superhard material after sintering, or embedding the electrodes in the grains of polycrystalline superhard material prior to sintering.

16. A method for measuring temperature of a body of polycrystalline superhard material, the polycrystalline superhard material comprising a plurality of intergrown grains of superhard material and a binder phase; the method comprising:

measuring bulk resistance of the polycrystalline superhard material between a plurality of electrodes embedded in or attached to the body of polycrystalline superhard material, the measured resistance being indicative of the temperature of the body of polycrystalline material.

17. The method of claim 16, further comprising incorporating the body of polycrystalline material into a cutting element and determining the temperature while the cutting element is engaging an earthen formation.

* * * * *